United States Patent
Mori et al.

(10) Patent No.: US 12,475,714 B2
(45) Date of Patent: Nov. 18, 2025

(54) IMAGE PROCESSING APPARATUS

(71) Applicant: TOYOTA JIDOSHA KABUSHIKI KAISHA, Toyota (JP)

(72) Inventors: Masahiro Mori, Nisshin (JP); Takahiro Fujita, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 431 days.

(21) Appl. No.: 18/090,777

(22) Filed: Dec. 29, 2022

(65) Prior Publication Data

US 2023/0245467 A1 Aug. 3, 2023

(30) Foreign Application Priority Data

Jan. 31, 2022 (JP) ................................. 2022-013099

(51) Int. Cl.
*G06V 20/58* (2022.01)
*G06V 20/62* (2022.01)

(52) U.S. Cl.
CPC ............ *G06V 20/58* (2022.01); *G06V 20/625* (2022.01)

(58) Field of Classification Search
CPC .............................. G06V 20/58; G06V 20/625
See application file for complete search history.

(56) References Cited

U.S. PATENT DOCUMENTS

| | | | | |
|---|---|---|---|---|
| 2012/0062732 A1* | 3/2012 | Marman | .................. | G06T 7/277 348/142 |
| 2016/0078904 A1* | 3/2016 | Yamaji | .................. | G11B 27/005 382/103 |
| 2019/0035127 A1* | 1/2019 | Choi | ........................ | G06T 11/60 |
| 2021/0201445 A1* | 7/2021 | Kang | ......................... | G06T 3/60 |

FOREIGN PATENT DOCUMENTS

| | | |
|---|---|---|
| JP | 2006-229467 A | 8/2006 |
| JP | 2009-094946 A | 4/2009 |
| JP | 2009-290249 A | 12/2009 |
| JP | 2019-185080 A | 10/2019 |
| WO | 2021/118954 A1 | 6/2021 |

OTHER PUBLICATIONS

Yan, J., Lin, S., Bing Kang, S., & Tang, X. (2013). Learning the change for automatic image cropping. In Proceedings of the IEEE conference on computer vision and pattern recognition (pp. 971-978). (Year: 2013).*

* cited by examiner

Primary Examiner — David Perlman
(74) Attorney, Agent, or Firm — Sughrue Mion, PLLC

(57) ABSTRACT

An image processing apparatus includes: a storage unit that stores a plurality of frames; and a processing unit that selects at least one selection frame from the plurality of frames and that outputs an extraction image extracted from the selected selection frame, wherein the processing unit outputs, as the extraction image, the image of the initial trimming range, and the evaluation value of the image of each trimming range is set based on at least one evaluation item of the following evaluation items: a positional relationship of a target object in the image of the trimming range, a size of the target object in the image of the trimming range, a vividness of the target object in the image of the trimming range, a brightness of the image of the trimming range, and a degree of cutoff of the target object in the image of the trimming range.

6 Claims, 13 Drawing Sheets

IMAGE PROCESSING APPARATUS

This nonprovisional application is based on Japanese Patent Application No. 2022-013099 filed on Jan. 31, 2022 with the Japan Patent Office, the entire contents of which are hereby incorporated by reference.

BACKGROUND

Field

The present disclosure relates to an image processing apparatus.

Description of the Background Art

An imaging apparatus that captures an image of a subject to acquire image data and detects a predetermined object from the acquired image data is conventionally known. For example, in the image processing apparatus described in Japanese Patent Application Laid-Open No. 2009-94946, for one or more detected objects (K1 to K4), whether the object is an effective object or an invalid object is determined based on information including one or more of the size, position, change amount, and focus evaluation value of the object. Then, portrait protection processing is performed on the object (for example, K4) determined to be the invalid object.

SUMMARY

For example, when posting (uploading) to a social networking service (hereinafter referred to as "SNS"), there is a demand to trim and extract a good image from a moving image and post it to the SNS or the like.

However, when an imaging-target object is a movable object such as a vehicle, it is difficult to satisfactorily extract the imaging-target object from each frame of the moving image and create an extraction image.

The present disclosure has been made in view of the above problem, and has an object to provide an image processing apparatus capable of creating an extraction image by satisfactorily extracting an imaging-target object from each frame of a moving image even when the imaging-target object is a movable object such as a vehicle or the like.

An image processing apparatus includes: a storage unit that stores a plurality of frames captured by an imaging apparatus that captures a moving image; and a processing unit that selects at least one selection frame from the plurality of frames stored in the storage unit and that outputs an extraction image extracted from the selected selection frame, wherein the processing unit sets an initial trimming range in the selected selection frame, when an update trimming range allowing for an evaluation value higher than an evaluation value of an image of the initial trimming range is able to be set, the processing unit outputs, as the extraction image, an image trimmed to correspond to the update trimming range, when no trimming range allowing for the evaluation value higher than the evaluation value of the image of the initial trimming range is able to be set, the processing unit outputs, as the extraction image, the image of the initial trimming range, and the evaluation value of the image of each trimming range is set based on at least one evaluation item of the following evaluation items: a positional relationship of a target object in the image of the trimming range, a size of the target object in the image of the trimming range, a vividness of the target object in the image of the trimming range, a brightness of the image of the trimming range, and a degree of cutoff of the target object in the image of the trimming range.

The processing unit selects a first selection frame and a second selection frame from the plurality of frames, and when an evaluation value of a first extraction image extracted from the first selection frame is higher than an evaluation value of a second extraction image extracted from the second selection frame, the processing unit outputs the first extraction image.

The processing unit lowers the evaluation value when an exclusion-target object registered in advance is captured in the image of the trimming range. The target object is a vehicle.

The processing unit sets an initial trimming range having a different composition based on a position of a vehicle serving as the target object.

The processing unit acquires in advance at least one of license plate information of a target vehicle serving as the target object and appearance information specifying an appearance of the target vehicle, and the processing unit selects, from the plurality of frames, a frame in which the target vehicle is captured, and creates the extraction image by trimming the selected frame to include the target vehicle.

The image processing apparatus further includes a memory in which an extraction processing model is stored, wherein the extraction processing model is a learned model that receives, as an input, an image including an imaging-target object and that outputs the extraction image having an evaluation value equal to or greater than a predetermined value.

It should be noted that a pre-learning model of the learned model (extraction processing model) used for the extraction processing includes, for example, a neural network. The neural network is a known neural network used for image recognition processing by deep learning. Examples of such a neural network include a convolution neural network (CNN), a recurrent neural network (RNN), and the like.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

<System Configuration>

Figure 1:
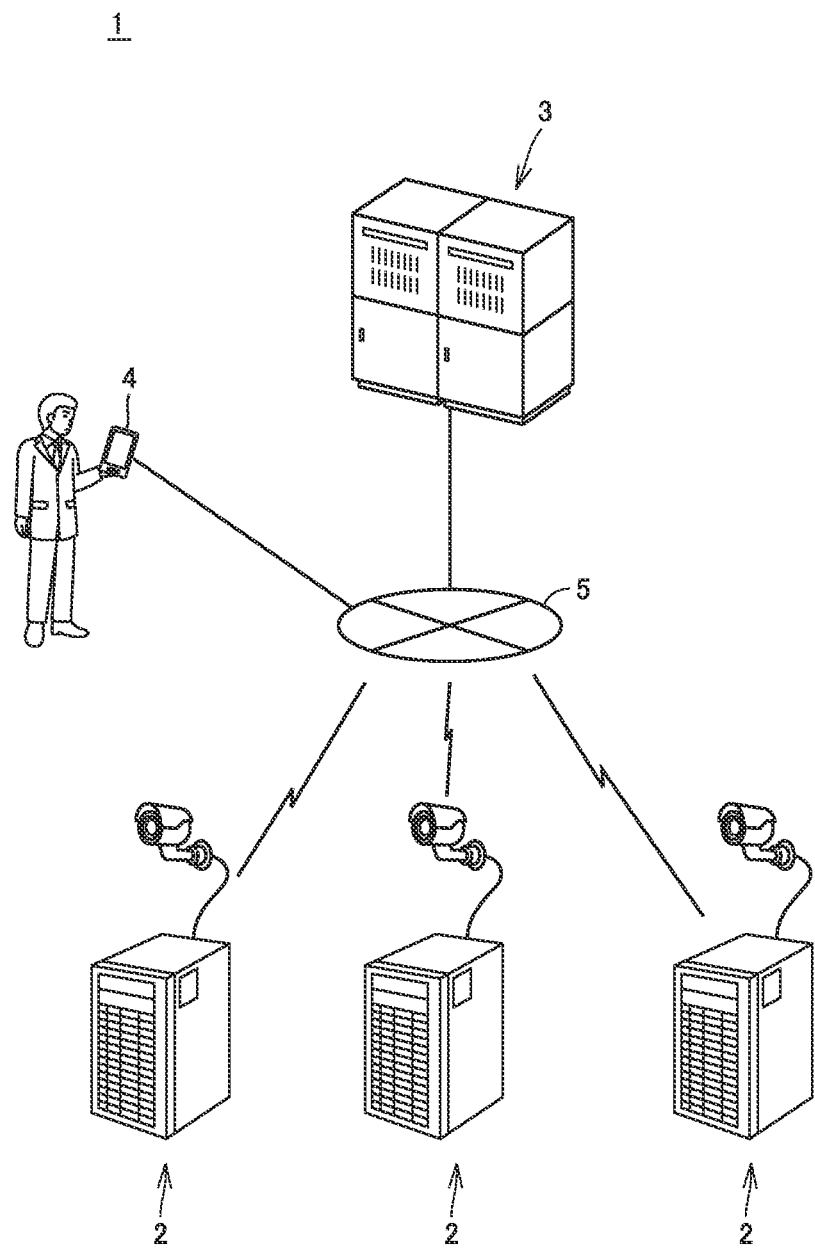
FIG. 1 schematically shows an image processing system 1.

FIG. 1 schematically shows an image processing system 1.

The image processing system 1 includes a photographing system 2, a server 3, and an output terminal 4. The output terminal 4 is, for example, a user's smartphone or personal computer. The server 3 functions as an image processing apparatus.

The photographing system 2 and the server 3 can communicate with each other through the network 5, and the server 3 and the output terminal 4 can also communicate with each other through the network 5.

Figure 2:
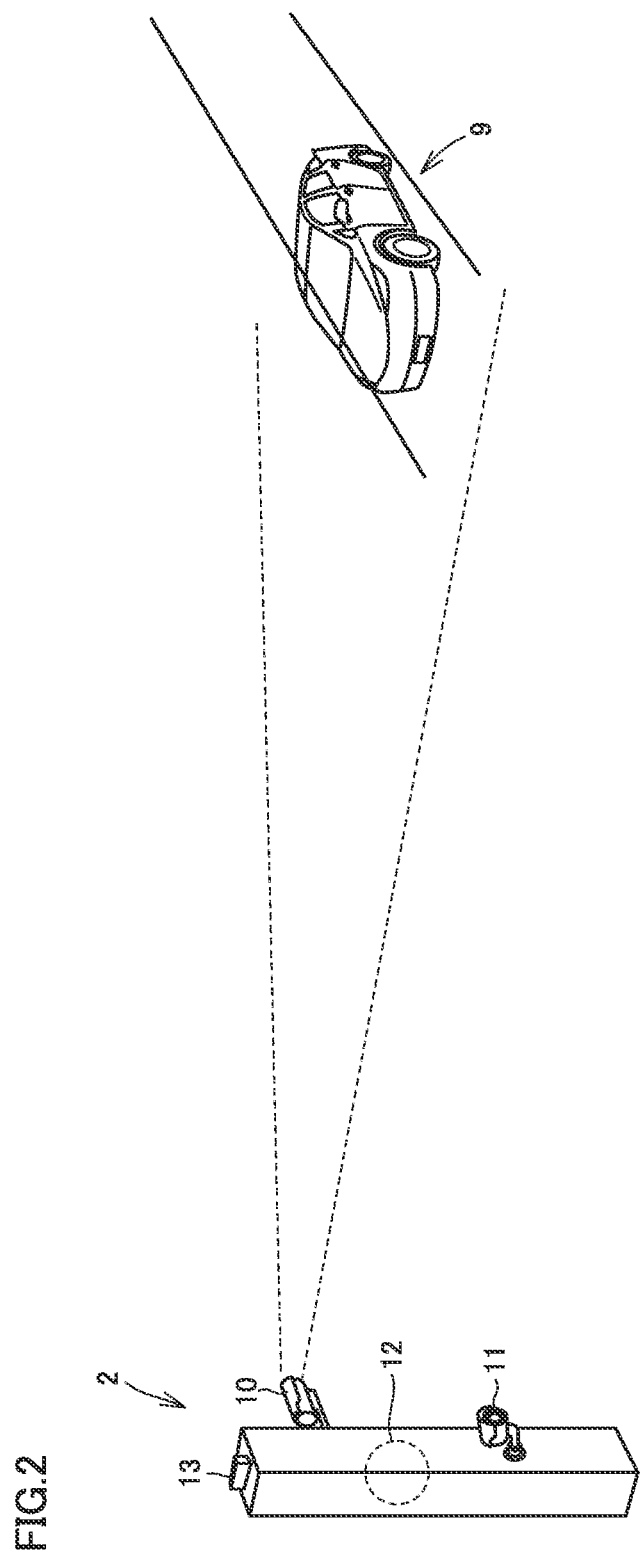
FIG. 2 is a perspective view showing the photographing system 2.

FIG. 2 is a perspective view showing the photographing system 2. The photographing system 2 includes an identification camera 10, a viewing camera 11, a control device 12, and a communication unit 13. The identification camera 10 is a camera that captures an image of a vehicle traveling on a road. In the example shown in FIG. 2, the imaging direction of the identification camera 10 is different from the imaging direction of the viewing camera 11. The identification camera 10 transmits the captured moving image data to the control device 12, and the viewing camera 11 transmits the captured moving image data to the control device 12. Note that a moving image includes a plurality of frames.

Figure 3:
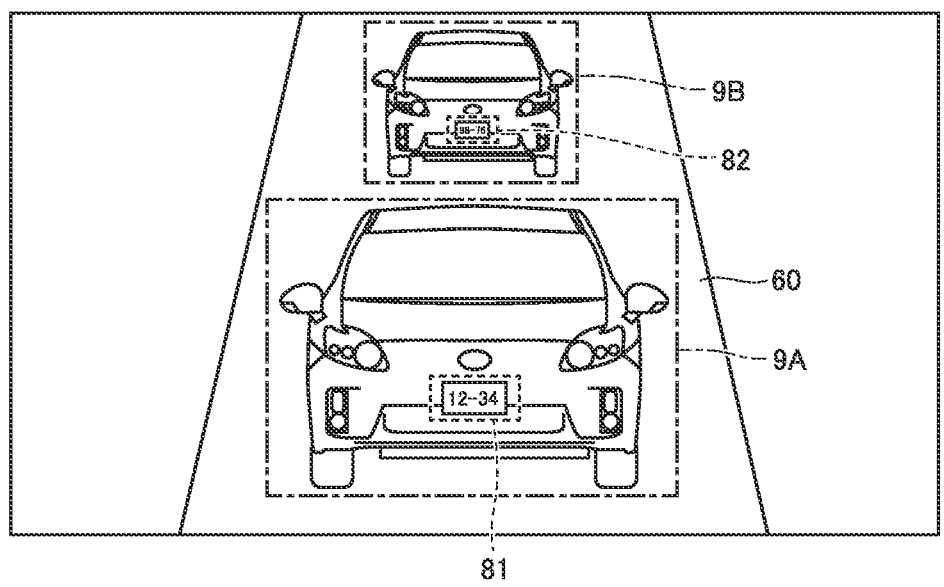
FIG. 3 is a diagram showing one frame FR0 of moving image data captured by the identification camera 10.

FIG. 3 is a diagram showing one frame FR0 of moving image data captured by the identification camera 10. In the frame FR0, a road 60 and a plurality of vehicles 9A and 9B traveling on the road 60 are captured.

Figure 4:
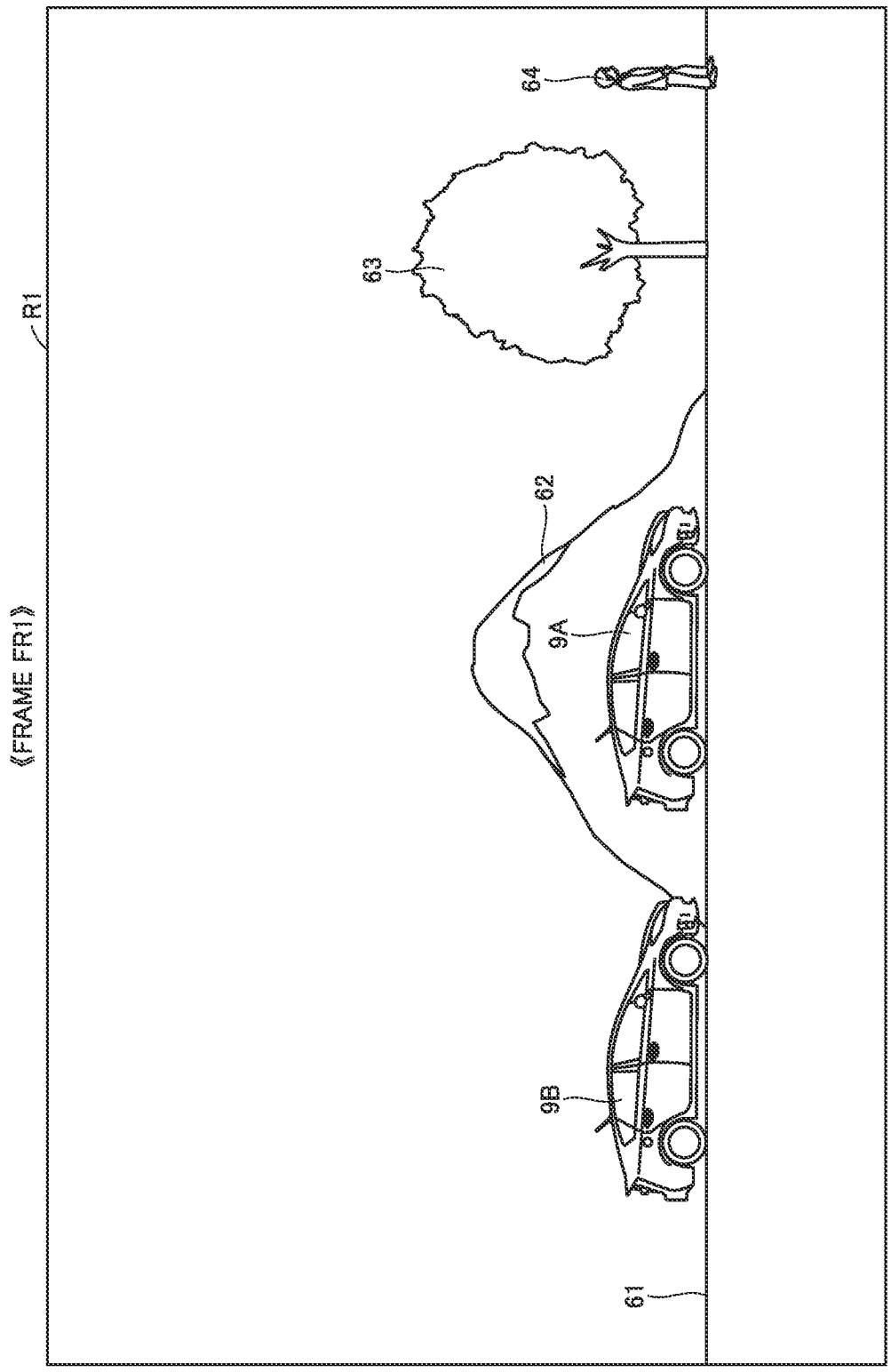
FIG. 4 is a diagram showing one frame FR1 of moving image data captured by the viewing camera 11.

FIG. 4 is a diagram showing one frame FR1 of moving image data captured by the viewing camera 11. A road 61, a mountain 62, and a tree 63 are captured in the frame FR1. The photographing area R1 indicates an area to be photographed by the viewing camera 11.

Figure 5:
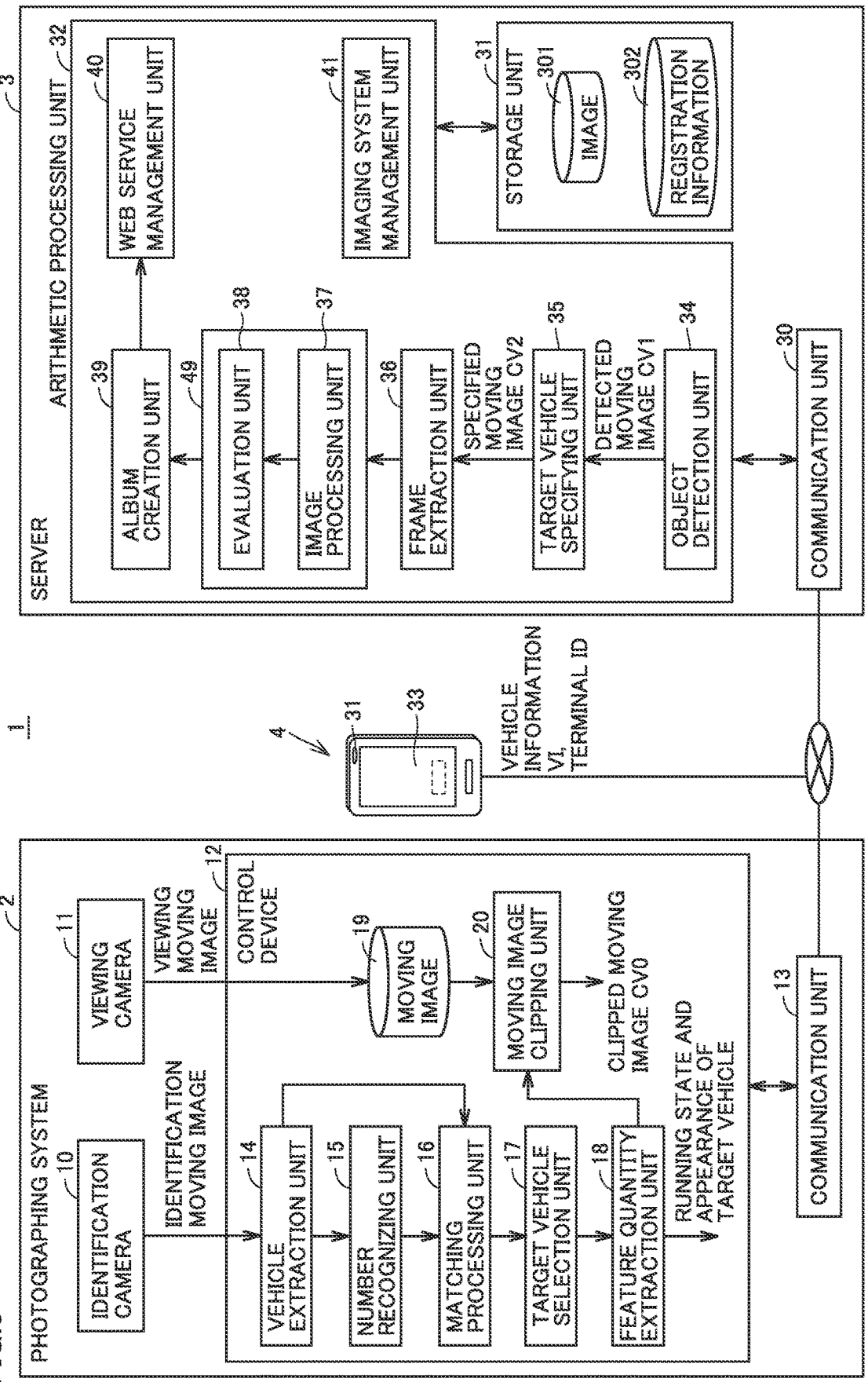
FIG. 5 is a block diagram showing a configuration of the image processing system 1.

FIG. 5 is a block diagram showing a configuration of the image processing system 1. The output terminal 4 includes an input unit 30 and a communication unit 31. The input unit 30 is, for example, a screen having a touch panel function.

The photographing system 2 includes an identification camera 10, a viewing camera 11, a control device 12, and a communication unit 13.

The control device 12 includes a vehicle extraction unit 14, a number recognizing unit 15, a matching processing unit 16, a target vehicle selection unit 17, a feature quantity extraction unit 18, a storage unit 19, and a moving image clipping unit 20.

The server 3 includes a communication unit 30, a storage unit 31, and an arithmetic processing unit 32. The arithmetic processing unit 32 includes an object detection unit 34, a target vehicle specifying unit 35, a frame extraction unit 36, an extraction processing unit 49 including an image processing unit 37 and an evaluation unit 38, an album creation unit 39, a web service management unit 40, and an imaging system management unit 41. The storage unit 31 includes an image storage unit 301 and a registration information storage unit 302.

In the image processing system 1 configured as described above, the user inputs vehicle information about the imaging target vehicle using the output terminal 4. Examples of the imaging target vehicle include a vehicle used by a user.

The vehicle information includes, for example, information indicating a vehicle number (number of the license plate) of the imaging target vehicle, a vehicle type, and color. The output terminal 4 transmits the terminal ID of the output terminal 4, the vehicle information VI, and the server 3. The server 3 stores the vehicle information VI and the terminal ID in the storage unit 31.

In the photographing system 2, the identification camera 10 outputs the identification moving image to the vehicle extraction unit 14. The vehicle extraction unit 14 performs a vehicle extraction process of extracting a vehicle from an identified moving image. The vehicle extraction unit 14 extracts the entire vehicle, not limited to the target vehicle, from the identification moving image. This processing is also referred to as "vehicle extraction processing". In the vehicle extraction processing, for example, a learned model generated by a machine learning technology such as deep layer learning can be used. In this example, the vehicle extraction unit 14 is implemented by a "vehicle extraction model".

The vehicle extraction unit 14 outputs a moving image (a frame including a vehicle) from which a vehicle is extracted among the identified moving images to the number recognizing unit 15, and outputs the moving image to the matching processing unit 16.

The number recognizing unit 15 recognizes the number of the license plate from the moving image in which the vehicle is extracted by the vehicle extraction unit 14. This processing is also referred to as "number recognition processing". Also in the number recognition processing, a learned model generated by a machine learning technology such as deep learning can be used. In this example, the number recognizing unit 15 is implemented by a "number recognizing model". The number recognizing unit 15 outputs the recognized number to the matching processing unit 16. The number recognizing unit 15 outputs the recognized number to the communication unit 13. Thus, the number of each vehicle is transmitted to the server 3.

The matching processing unit 16 associates the vehicle extracted by the vehicle extraction unit 14 with the number recognized by the number recognizing unit 15. This processing is also referred to as "matching processing". Specifically, with reference to FIG. 3 again, a situation in which two vehicles 9A and 9B are extracted and two numbers 81 and 82 are recognized will be described as an example. The matching processing unit 16 calculates, for each number, the distance between the number and the vehicle (the distance between the coordinates of the number on the frame and the coordinates of the vehicle). Then, the matching processing unit 16 matches the number with a vehicle having a short distance from the number. In this example, since the distance between the number 81 and the vehicle 9A is shorter than the distance between the number 81 and the vehicle 9B, the matching processing unit 16 associates the number 81 with the vehicle 9A. Similarly, the matching processing unit 16 associates the number 82 with the vehicle 9B. The matching processing unit 16 outputs the result of the matching processing (the vehicle associated with the number) to the target vehicle selection unit 17.

The target vehicle selection unit 17 selects a vehicle whose number matches the number of the target vehicle (the vehicle received from the server 3) from among the vehicles whose numbers are associated by the matching process as the target vehicle. The target vehicle selection unit 17 outputs the vehicle selected as the target vehicle to the feature quantity extraction unit 18.

The feature quantity extraction unit 18 extracts a feature quantity of the target vehicle by analyzing a moving image including the target vehicle. More specifically, the feature quantity extraction unit 18 calculates the traveling speed of the target vehicle based on the temporal change (For example, the amount of movement of the target vehicle between frames and the amount of change of the size of the target vehicle between frames.) of the target vehicle in the frame including the target vehicle. The feature quantity extraction unit 18 may calculate, for example, the acceleration (deceleration) of the target vehicle in addition to the traveling speed of the target vehicle. Further, the feature quantity extraction unit 18 extracts information on the appearance (body shape, body color, etc.) of the target vehicle using a well-known image loss recognition technology. The feature quantity extraction unit 18 outputs the feature quantities (running state and appearance) of the target vehicle to the moving image clipping unit. The feature quantity extraction unit 18 outputs the feature quantity of the target vehicle to the communication unit 13. Thus, the feature amount of the target vehicle is transmitted to the server 3.

The storage unit 19 temporarily stores the viewing moving image. The storage unit 19 is typically a ring buffer (circulation buffer), and has an annular storage area in which the head and the tail of the one-dimensional array are logically connected. The newly captured viewing moving image is stored in the storage unit 19 for a predetermined time period that can be stored in the storage area. The viewing moving image (old moving image) which has exceeded the predetermined time is automatically deleted from the storage unit 19.

The moving image clipping unit 20 cuts out, from the viewing moving image stored in the storage unit 19, a portion where the target vehicle is likely to be photographed, based on the characteristic amounts (the traveling speed, acceleration, body shape, body color, and the like of the target vehicle) extracted by the feature quantity extraction unit 18. More specifically, the distance between the point captured by the identification camera 10 and the point captured by the viewing camera 11 is known. Therefore, if the traveling speed (and acceleration) of the target vehicle is known, the moving image clipping unit 20 can calculate the time difference between the timing at which the target vehicle is photographed by the identification camera 10 and the timing at which the target vehicle is photographed by the viewing camera 11. The moving image clipping unit 20 calculates the timing at which the target vehicle is photographed by the viewing camera 11 based on the timing at which the target vehicle is photographed by the identification camera 10 and the above-described time difference.

Then, the moving image clipping unit 20 clips the moving image from the viewing moving image so as to include the moving image from when the target vehicle begins to enter the photographing area R1 to when the target vehicle moves out of the photographing area R1. In this way, the moving image clipping unit 20 generates the clipped moving image CV0.

Figure 6:
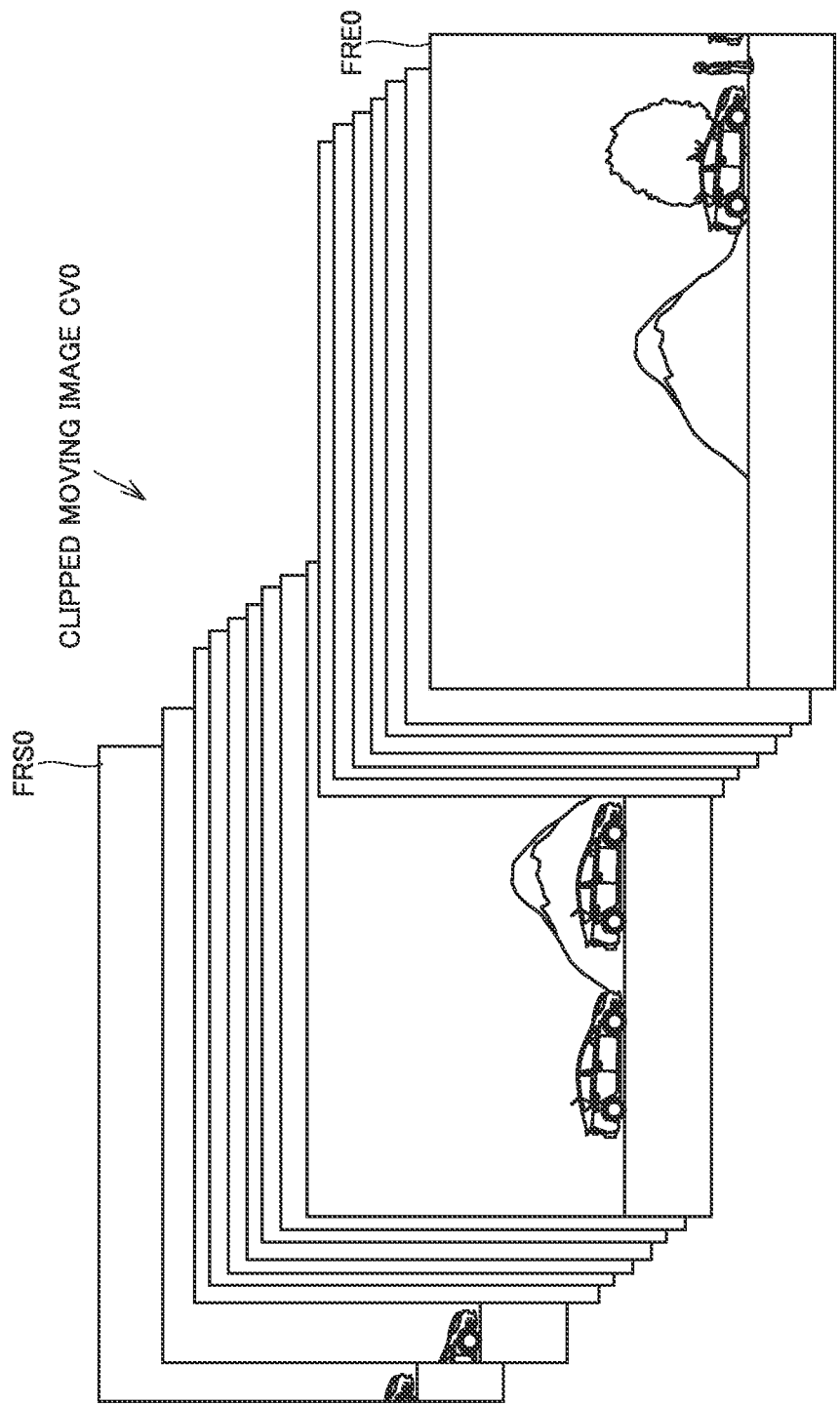
FIG. 6 is a diagram schematically showing a clipped moving image CV0.

FIG. 6 is a diagram schematically showing a clipped moving image CV0. The clipped moving image CV0 includes a plurality of frames FRS0 to FRE0.

The frame FRS0 is a frame in a state where the vehicle 9A, which is the target vehicle, begins to enter the photographing area R1. The frame FRE0 is a frame in a state immediately before the vehicle 9A exits from the photographing area R1.

The moving image clipping unit 20 transmits the clipped moving image CV0 to the communication unit 13. The communication unit 13 transmits the clipped moving image CV0 to the server 3.

In the server 3, the storage unit 31 stores, in the image storage unit 301, the clipped moving image CV0, an extracted image described later, information such as a high evaluation image obtained by arithmetic processing by the server 3, and various evaluation information.

The registration information storage unit 302 stores registration information about a vehicle photographing service. The registration information includes personal information of a user who has submitted provision of a vehicle photographing service and vehicle information of the user. The personal information of the user includes, for example, information on an identification number (ID) of the user, a name, a date of birth, an address, a telephone number, a mail address, and the like. The vehicle information of the user includes information on the number of the license plate of the vehicle. The vehicle information may include information on, for example, the type of vehicle, an annual type, a body shape (sedan type, wagon type, one-box type), body color, and the like.

In FIG. 5, the communication unit 30 performs bidirectional communication with the communication unit 13 of the photographing system 2 via a network. The communication unit 30 transmits the number of the target vehicle to the photographing system 2. Further, the communication unit 30 receives the cut-out moving image CV0 including the target vehicle and the feature amount (running state and appearance) of the target vehicle from the photographing system 2.

Figure 7:
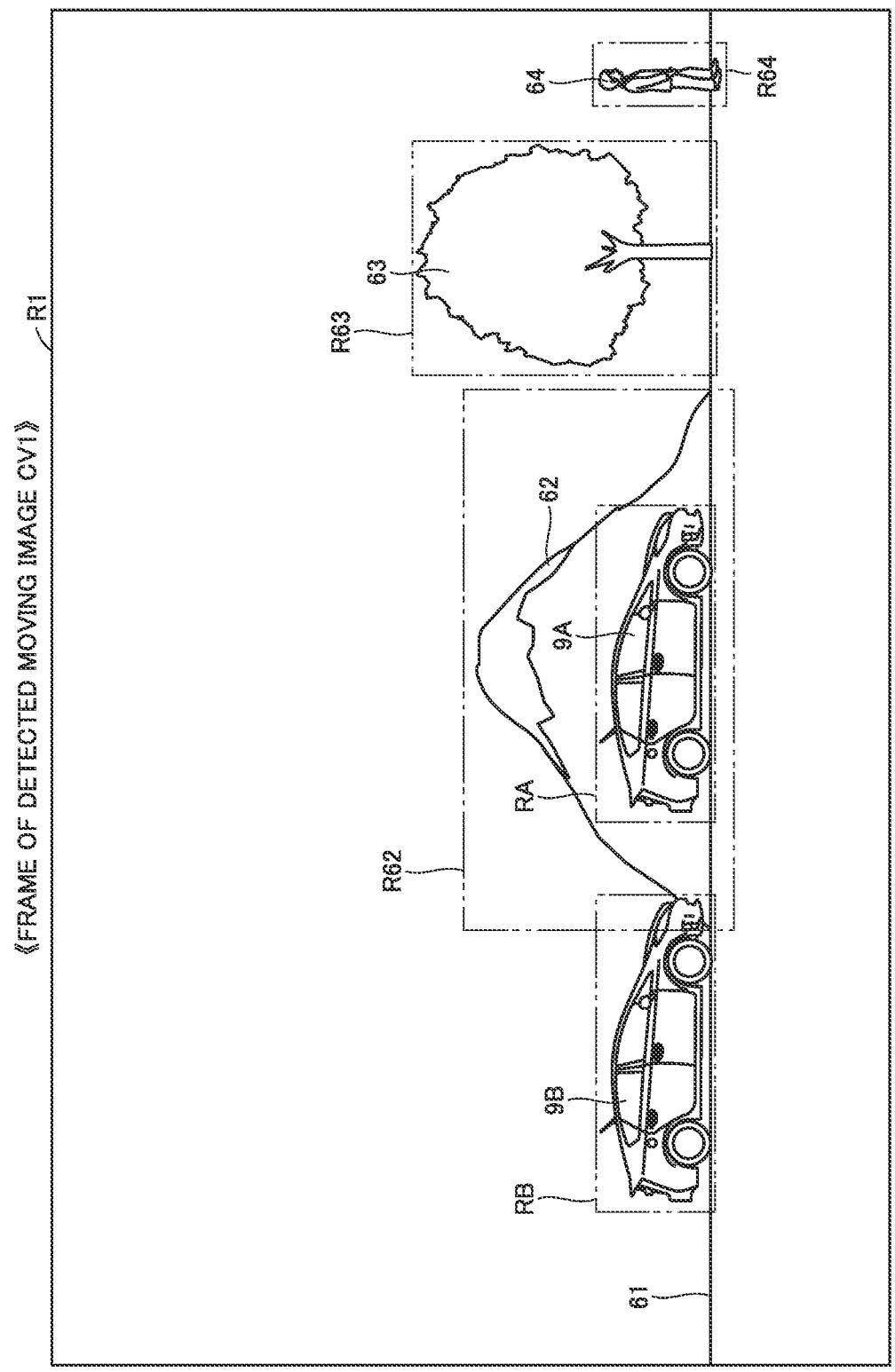
FIG. 7 shows an example of a frame subjected to object detection processing.

The object detection unit 34 performs object detection processing in each of the frames FRS0 to FRE0 of the clipped moving image CV0. FIG. 7 shows an example of a frame subjected to object detection processing.

In this frame, a road 61, a mountain 62, a tree 63, a walker 64, and a plurality of vehicles 9A and 9B traveling on the road 61 are captured.

A region R62 represents a region occupied by the mountain 62. A region R63 represents a region occupied by the tree 63. A region R64 represents a region occupied by the walker 64. A region RA represents a region occupied by the vehicle 9A, and a region RB represents a region occupied by the vehicle 9B. In the "object detection process", an object detection model such as YOLO (You Look Only Once) can be used.

In FIG. 5, the object detection unit 34 generates a detected moving image CV1 obtained by performing object detection processing on all frames of the clipped moving image CV0. For this reason, the regions RA, RB, and the like are set in the frames FRS1 to FRE1 of the detection moving image CV1. Then, the object detection unit 34 transmits the detected moving image CV1 to the target vehicle specifying unit 35.

The target vehicle specifying unit 35 specifies the target vehicle in each of the frames FRS1 to FRE1 received from the object detection unit 34. The target vehicle specifying unit 35 specifies the target vehicle based on the feature amount (That is, a traveling state such as a traveling speed and an acceleration, and an appearance of a body shape, a body color, and the like are displayed.) of the target vehicle from the objects extracted by the object detection unit 34. This processing is also referred to as "target vehicle specifying processing". Also in the target vehicle specifying process, a learned model generated by a machine learning technology such as deep learning can be used. In this example, the target vehicle specifying unit 35 is realized by the "target vehicle specifying model". In the present embodiment, the target vehicle is the vehicle 9A.

Then, a specific moving image CV2 in which the target vehicle is specified by the target vehicle specifying unit 35 is generated. Note that the specific moving image CV2 includes a plurality of frames FRS2 to FRE2.

The frame extraction unit 36 sequentially selects frames from the specific moving image CV2 and transmits the selected frames to the extraction processing unit 49. The extraction processing unit 49 includes an image processing unit 37 and an evaluation unit 38.

The extraction processing unit 49 extracts an extracted image from the selected frame selected by the frame extraction unit 36 based on an evaluation value described later (extraction process).

The extraction processing unit 49 generates an extracted image for each of the frames FRS2 to FRE2, and outputs the extracted image to the album creation unit 39. Then, the album creation unit 39 selects an extracted image having a high evaluation value among the extracted images extracted from each selected frame as a high evaluation image. The album creation unit 39 transmits the selected high evaluation image to the output terminal 4 through the communication unit 30.

Figure 8:
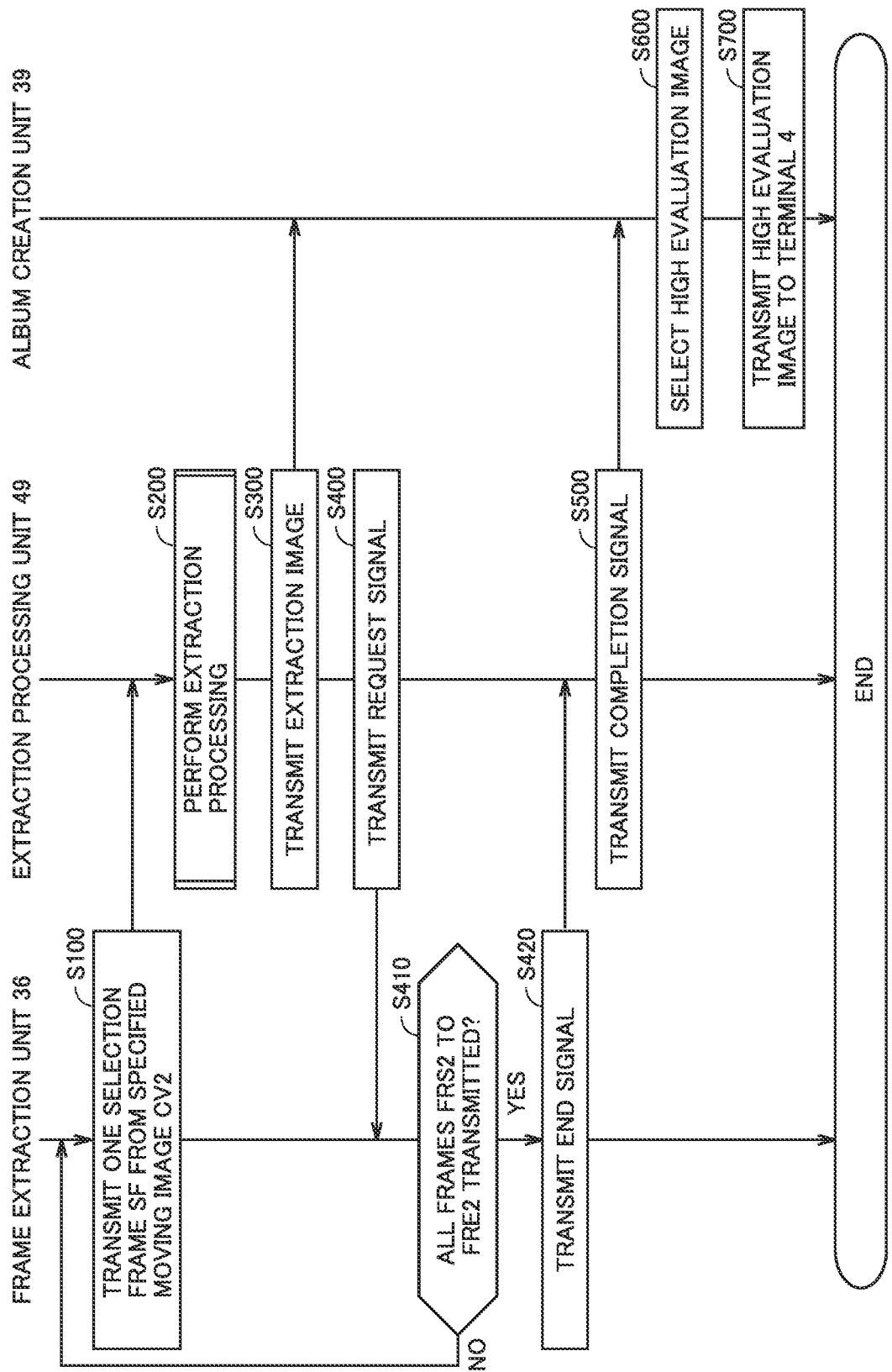
FIG. 8 is a flowchart showing a flow from generation of a specific moving image CV2 to selection of a high evaluation image.

FIG. 8 is a flowchart showing a flow from generation of a specific moving image CV2 to selection of a high evaluation image.

The frame extraction unit 36 transmits the untransmitted frame of the specific moving image CV2 as one selected frame SF to the extraction processing unit 49 (S100). The frame extraction unit 36 first transmits a frame FRS2. Upon receiving the selected frame SF, the extraction processing unit 49 performs extraction processing (S200).

When the extraction processing unit 49 ends the extraction processing, the extraction processing unit 49 transmits the extracted image to the album creation unit 39 (S300). The extraction processing unit 49 transmits a request signal to the frame extraction unit 36 (S400). When the frame extraction unit 36 receives the request signal, the frame extraction unit 36 determines whether or not all the frames FRS2 to FRE2 have been transmitted (S410). When the frame extraction unit 36 determines that all the frames FRS2 to FRE2 have been transmitted to the extraction processing unit 49 (Yes in S410), the frame extraction unit 36 transmits an end signal to the extraction processing unit 49 (S420).

On the other hand, when determining that there is an untransmitted frame (No in S410), the frame extraction unit 36 returns to S100 and transmits the untransmitted frame to the extraction processing unit 49.

When the extraction processing unit 49 receives the end signal, the extraction processing unit 49 transmits a completion signal to the frame extraction unit 36 (S500).

The album creation unit 39 selects a predetermined number of extracted images from the plurality of extracted images received (S600). For example, the album creation unit 39 selects a predetermined number of extracted images as high evaluation images in descending order of evaluation values described later. Then, the album creation unit 39 transmits the high evaluation image to the output terminal 4 (S700).

Figure 9:
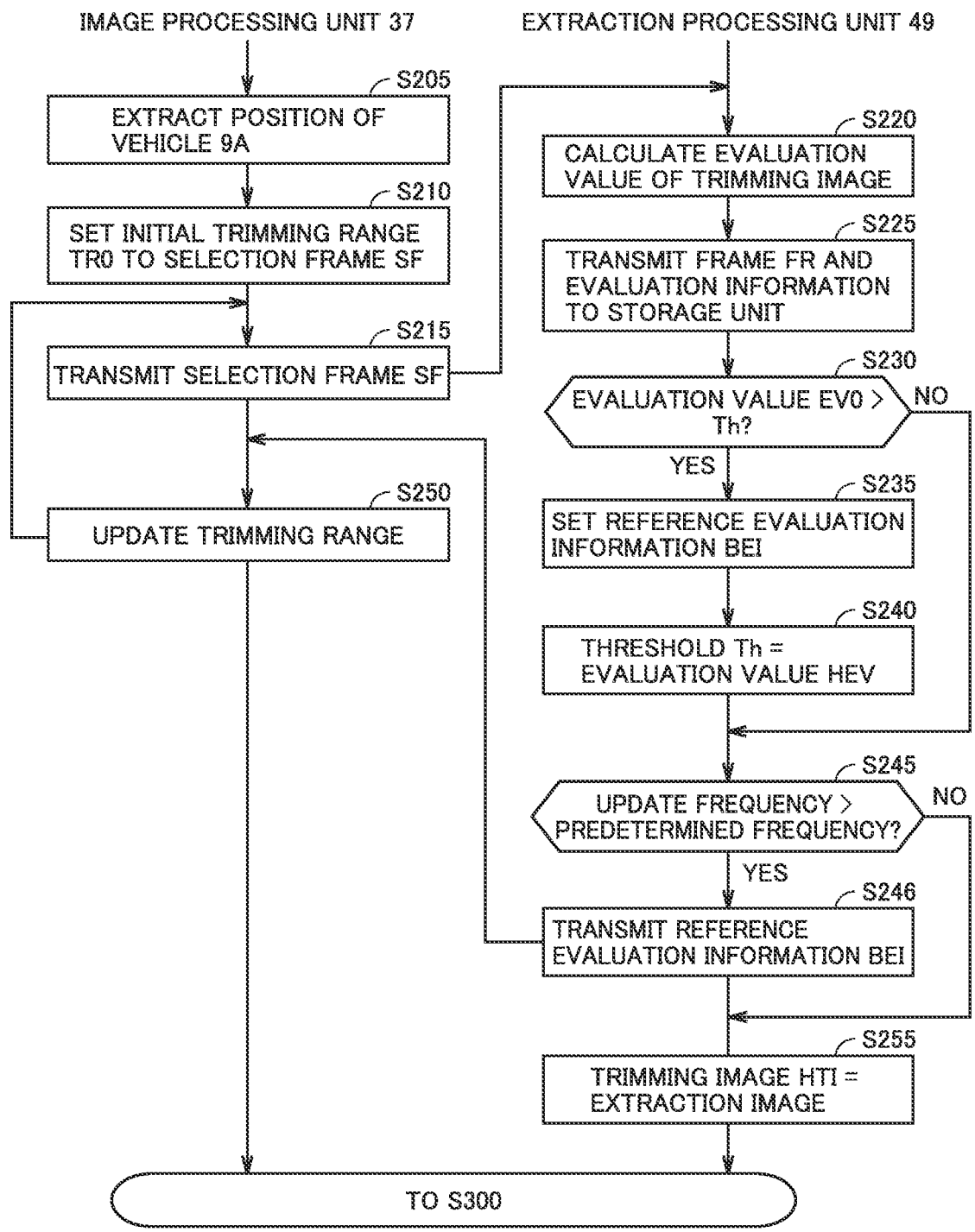
FIG. 9 is a flowchart showing extraction processing in S200.

FIG. 9 is a flowchart showing extraction processing in S200. When performing the extraction processing, the image processing unit 37 first extracts the position of the vehicle 9A (S205). For example, the image processing unit 37 extracts the center position of the area RA from the selected frame SF. The image processing unit 37 sets the initial trimming range TR0 to the selected frame SF based on the center position of the area RA (S210). The initial trimming range TR0 varies depending on the center position of the region RA.

Figure 10:
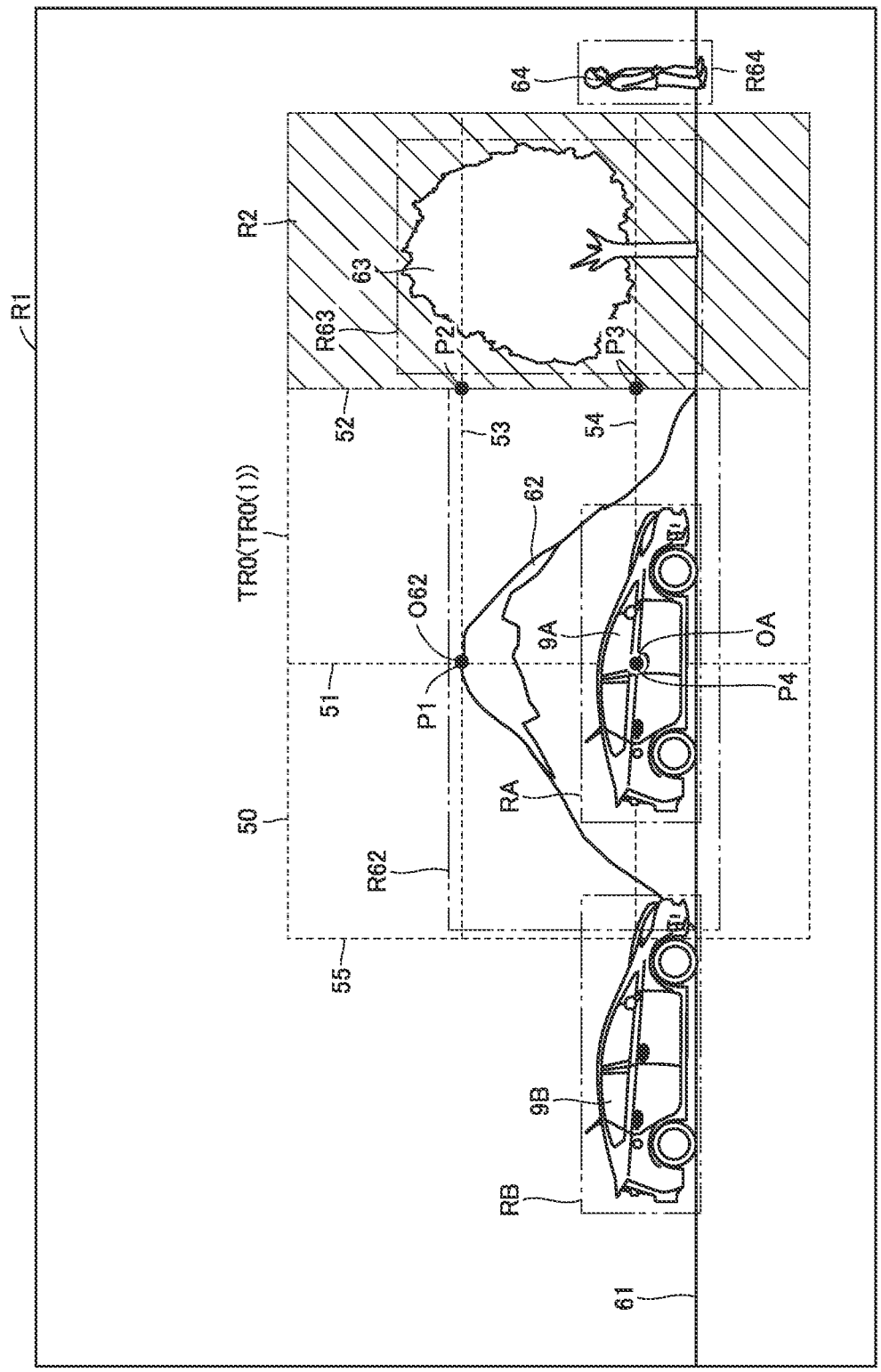
FIG. 10 is a diagram showing a frame FR in which the initial trimming range TR0 (1) is set.
Figure 11:
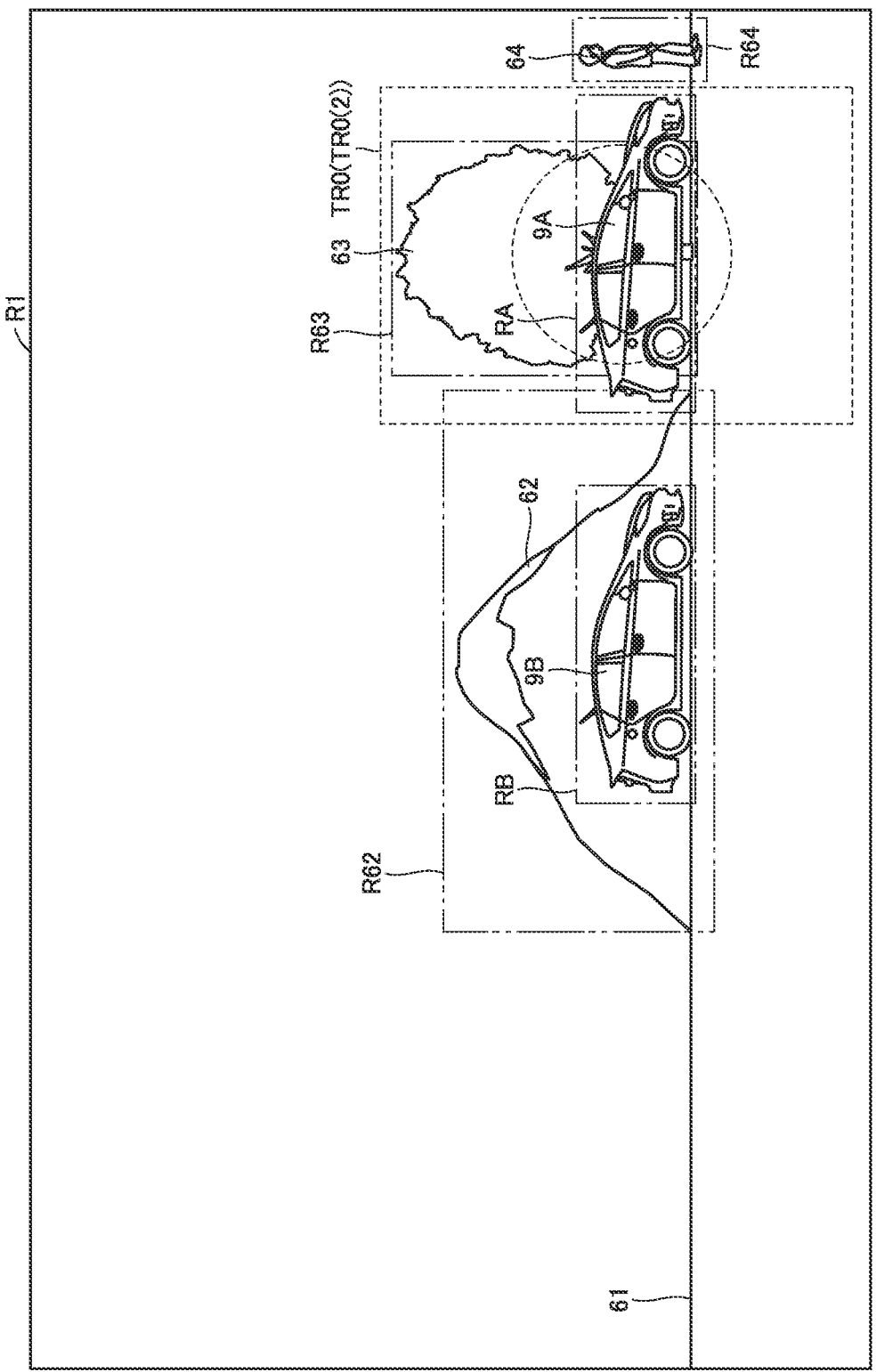
FIG. 11 shows a frame FR in which the initial trimming range TR0 (2) is set.

For example, when the vehicle 9A is positioned at a position as shown in FIG. 10, the initial trimming range TR0 (1) is set as the initial trimming range TR0. When the vehicle 9A is positioned at a position as shown in FIG. 11, the initial trimming range TR0 (2) is set as the initial trimming range TR0.

In the example shown in FIG. 10, by setting the initial trimming range TR0 (1), the positional relationship among the vehicle 9A, the mountain 62, and the tree 63 becomes a positional relationship suitable for the Rule-Of-Third method. Further, in the example shown in FIG. 11, by setting the initial trimming range TR0 (2), the positional relationship between the tree 63 and the vehicle 9A becomes a positional relationship suitable for the hinomaru composition method.

A three-division composition line 50 in FIG. 10 schematically shows the Rule-Of-Third method.

The three-division composition line 50 divides the initial trimming range TR0 into nine. The three-division composition line 50 includes vertical lines 51 and 52 arranged at equal intervals, horizontal lines 53 and 54 arranged at equal intervals, an outer frame 55, and intersection points P1, P2, P3, and P4. The outer frame 55 coincides with the initial trimming range TR0.

The initial trimming range TR0 is arranged such that the center position OA of the region RA coincides with the position P4. The initial trimming range TR0 is set such that the vertex O62 of the mountain 62 coincides with or approaches the position P1. Further, assuming that the region between the vertical line 52 and the outer frame 55 is the region R2, the initial trimming range TR0 is set so that the region R63 is positioned in the region R2, or the majority of the region R63 is positioned in the region R2.

Since the photographing area R1 is fixed, the positions of the vertex O62 and the tree 63 are fixed. Therefore, by extracting the center position OA, the image processing unit 37 can set the initial trimming range TR0 in the selected frame SF.

Returning to FIG. 9, the image processing unit 37 transmits the selected frame SF in which the initial trimming range TR0 is set to the evaluation unit 38 (S215).

The evaluation unit 38 calculates an evaluation value EV of the initial trimming image TI0 in the initial trimming range TR0 (S220).

The evaluation unit 38 calculates the evaluation value EV0 of the initial trimming image TI0 based on the evaluation items EI1 to EI5 and the reduction item DI1.

The evaluation unit 38 calculates the evaluation value EV based on the sum TP of the item points IP1 to IP5 of the evaluation items EI1 to EI5 and the item coefficient DP of the reduction item DI1. Specifically, the evaluation value EV is calculated based on the following expression (1). The item points IP1 to IP5 are positive numbers.

$$\text{Evaluation value } EV = \text{additional value } TP \times \text{item coefficient } DP \qquad (1)$$

The evaluation item EI1 is a positional relationship between the vehicle 9A as an imaging target and the mountain 62 and tree 63 as a background target.

In the example shown in FIG. 10, the evaluation unit 38 calculates the item point IP1 of the evaluation item EH based on the positional shift amount between the intersection point P1 and the vertex O62 and the protruding amount of the region R63 (the region R63) from the region R2. The evaluation unit 38 lowers the item point IP1 as the positional shift amount of the intersection point P1 and the vertex O62 increases, and lowers the item point IP1 as the protruding amount of the region R63 increases.

The evaluation item EI2 is the size of the vehicle 9A within the trimming range. The evaluation unit 38 calculates the item point IP2 of the evaluation item EI2 based on the area ratio AR0 of the area RA to the area of the initial trimming range TR0. When the area ratio AR0 is not within the predetermined range, the evaluation unit 38 sets the item point IP2 to be low.

The evaluation item EI3 is the vividness of the target vehicle and the background object. In the example shown in FIG. 10, the target vehicle is the vehicle 9A, and the background targets are the mountain 62 and the tree 63. The evaluation unit 38 calculates the vividness of the image of the vehicle 9A, the mountain 62, the tree 63 and the like based on each pixel data of the initial trimming image TI0, and calculates the item point IP3 of the evaluation item EI3.

The evaluation item EI4 is the brightness of the trimming image. The evaluation unit 38 calculates the brightness of the initial trimming image TI0 based on each pixel data of the initial trimming image TI0, and calculates the item point IP4 of the evaluation item EI4. When the brightness of the initial trimming image TI0 is not within the predetermined range, the evaluation unit 38 sets the item point IP4 to be low.

The evaluation item EI5 is the degree of appearance of the target vehicle. The evaluation unit 38 calculates the degree of appearance of the vehicle 9A based on the protruding amount of the area RA protruding from the photographing area R1. The evaluation unit 38 lowers the item point IP5 of the evaluation item EI5 as the protruding amount of the area RA from the photographing area R1 increases.

The deduction item DI1 indicates whether or not the exclusion object has entered the trimming range. When there is an exclusion object in the trimming image, the evaluation unit 38 sets the item coefficient DP of the decrement item DI1 to "0", and when there is no exclusion objective in the trimming image, the evaluation unit 38 sets the item coefficient DP to "1". Note that the gradual exclusion object includes information that can identify individuals, vehicles other than the target vehicle, and the like. The information that can identify individuals includes, for example, a person image that can identify a face, a nameplate of a house, and the like. The information on the gradual exclusion object is stored in the storage unit 31, for example. The evaluation unit 38 may calculate the evaluation value based on the evaluation items EH to EI5.

In the example shown in FIG. 10, since the area RB has entered the initial trimming range TR0, the evaluation unit 38 sets the item coefficient DP of the reduction item DI1 for the initial trimming image TI0 to "0".

In FIG. 9, when the evaluation of the evaluation items EI1 to EI5 and the reduction item DI1 is finished, the evaluation unit 38 calculates an evaluation value EV0 of the initial trimming image TI0 (S220).

After completing the calculation of the evaluation value, the evaluation unit 38 transmits the frame FR in which the initial trimming range TR0 is set and the evaluation information EI to the storage unit 31 (S225).

After calculating the evaluation value EV0, the evaluation unit 38 determines whether or not the evaluation value EV0 is larger than the threshold value Th (S230). The initial value of the threshold Th is a negative value. Since the evaluation value EV0 is equal to or greater than 0, the evaluation value EV0 is larger than the threshold value Th.

When the evaluation unit 38 determines that the evaluation value EV0 is larger than the threshold value Th (Yes in S230), the evaluation unit 38 sets the reference evaluation information BEI (S235).

The reference evaluation information BEI is information on the trimming image HTI having the highest evaluation value in the trimming image already evaluated. The reference evaluation information BEI includes a trimming image HTI, evaluation information EI of the trimming image HTI, and information indicating a trimming region HTR of the trimming image HTI. The evaluation information EI may include information indicating the item points IP1 to IP5 of the trimming image HTI, the item coefficient DP of the reduction item DI1, and the evaluation value HEV of the trimming image HTI.

Further, the reference evaluation information BEI may include the positional shift amount between the intersection point P1 and the vertex O62 in the trimming image HTI, the protruding amount of the region R63 from the region R2, the area ratio AR, the sharpness of the target vehicle and the background object, the lightness of the trimming image, and the protruding amount of the region RA from the photographing area R1.

When the evaluation unit 38 evaluates only the initial trimming image TI0, the reference evaluation information BEI includes evaluation information EI of the initial trimming image TI0 and information indicating the initial trimming range TR0. The trimming image HTI is the initial trimming range TR0, and the trimming region HTR is the initial trimming range TR0.

When the evaluation unit 38 sets the reference evaluation information BEI, the evaluation unit 38 sets the threshold Th to the evaluation value HEV (S240).

The evaluation unit 38 determines whether or not the update frequency of the reference evaluation information BEI is greater than a predetermined frequency (S245). The update frequency of the reference evaluation information BEI indicates the frequency at which the reference evaluation information BEI is updated within a predetermined time. In a state in which the evaluation unit 38 evaluates only the initial trimming image TI0, the update frequency of the reference evaluation information BEI is greater than a predetermined frequency.

When the evaluation unit 38 determines that the update frequency is greater than the predetermined frequency (Yes in S245), the evaluation unit 38 transmits the reference evaluation information BEI to the image processing unit 37 (S246). Upon receiving the reference evaluation information BEI, the image processing unit 37 updates the trimming range so that the evaluation value is higher than the evaluation value included in the reference evaluation information BEI (S250).

For example, when determining that the item coefficient DP is "0", the image processing unit 37 deforms the initial trimming range TR0 so that the exclusion object does not enter the trimming range, and sets the trimming range TR1.

Figure 12:
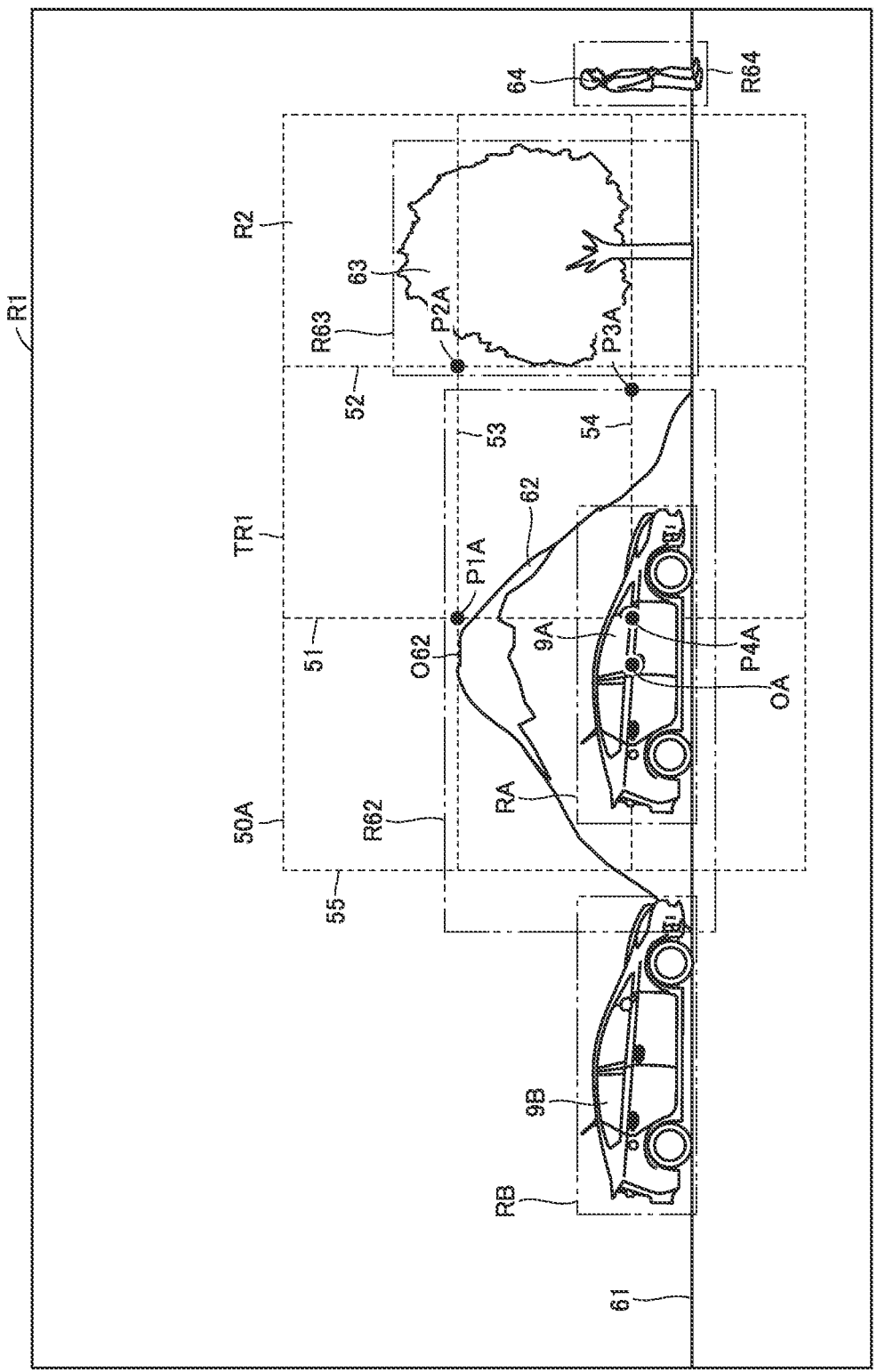
FIG. 12 is a diagram showing a selection frame SF in a state in which the trimming range TR1 is set.

FIG. 12 is a diagram showing a selection frame SF in a state in which the trimming range TR1 is set. In the state shown in FIG. 10, when the trimming range is shifted to the right so that the region RB does not fall within the initial trimming range TR0, a new region R64 is included in the trimming range. Therefore, the evaluation unit 38 sets the trimming range TR1 so that the region R64 and the region RB do not enter the trimming range.

Further, the image processing unit 37 may set the trimming range TR1 so that the region RB and the region R64 are not included and at least one of the item points IP1 to IP5 of the evaluation items EI1 to EI5 is improved.

For example, when determining that the area ratio AR in the trimming image HTI is larger than the predetermined range, the image processing unit 37 sets the trimming range TR1 longer in the vertical direction than the trimming region HTR. For example, when determining that the area ratio AR is smaller than the predetermined range, the image processing unit 37 sets a trimming range TR1 shorter in the vertical direction than the trimming region HTR.

For example, when the image processing unit 37 determines that the protruding amount from the region R2 to the region R63 in the trimming image HTI is larger than a predetermined value, the trimming range TR1 is set so that the protruding amount becomes smaller.

For example, when determining that the positional shift amount between the intersection point P1 and the vertex O62 in the trimming image HTI is larger than a predetermined threshold value, the image processing unit 37 sets the trimming range TR1 so that the positional shift amount becomes smaller.

Specifically, the image processing unit 37 sets the three-division composition line 50A in the trimming range TR1. Then, the trimming range TR1 is set such that the distance between the intersection point P1A and the vertex O62 is smaller than the distance between the intersection point P1 and the vertex O62 in the trimming region HTR.

For example, when the image processing unit 37 determines that the sharpness of the vehicle 9A or the like in the trimming image HTI is smaller than a predetermined threshold value, the image processing unit 37 performs edge enhancement processing or the like within the trimming range TR1.

For example, when determining that the brightness of the trimming image HTI is smaller than a predetermined threshold value, the image processing unit 37 increases the brightness of each pixel in the trimming range TR1.

Returning to FIG. 9, when the image processing unit 37 updates the trimming range to the trimming range TR1 (S250), the image processing unit 37 transmits a frame FR in which the trimming range TR1 is set to the evaluation unit 38 (S215).

The evaluation unit 38 evaluates the trimming image TI1 within the trimming range TR1 (S220). Specifically, evaluation items EH to EI5 and a reduction item DI1 are evaluated to calculate an evaluation value EV1.

When the evaluation of the trimming image TI1 is completed, the evaluation unit 38 transmits the frame FR in which the trimming range TR1 is set and the evaluation information EI to the storage unit 31 (S225).

Then, in S230, the evaluation unit 38 determines whether or not the evaluation value EV1 is greater than the threshold value Th. When the evaluation value EV1 is greater than the threshold value Th (Yes in S230), the evaluation unit 38 resets the reference evaluation information BEI (S235).

On the other hand, when the evaluation unit 38 determines that the evaluation value EV1 is equal to or less than the threshold value Th (No in S230), the evaluation unit 38 determines whether or not the update frequency of the reference evaluation information BEI is greater than the predetermined frequency without resetting the reference evaluation information BEI (S245).

When the evaluation unit 38 determines that the update frequency of the reference evaluation information BEI is equal to or less than the predetermined frequency (No in S245), the evaluation unit 38 sets the trimming image HTI set as the reference evaluation information BEI as the extracted image (S255).

The extraction process is terminated. Then, in FIG. 8, the evaluation unit 38 of the extraction processing unit 49 transmits the extracted image to the album creation unit 39 (S300).

At this time, the extraction processing unit 49 transmits the trimmed image HTI as the extracted image, the evaluation value HEV, and the center position information of the area RA in the trimmed image HTI to the album creation unit 39.

Then, the frame extraction unit 36 selects a predetermined number of extracted images from the plurality of extracted images received as high evaluation images (S600). At this time, the high evaluation images may be selected such that the center positions of the regions RA of the extracted images are apart from each other.

Note that [Extraction Process] in S200 may be performed using a learned model.

<Learned Model>

Figure 13:
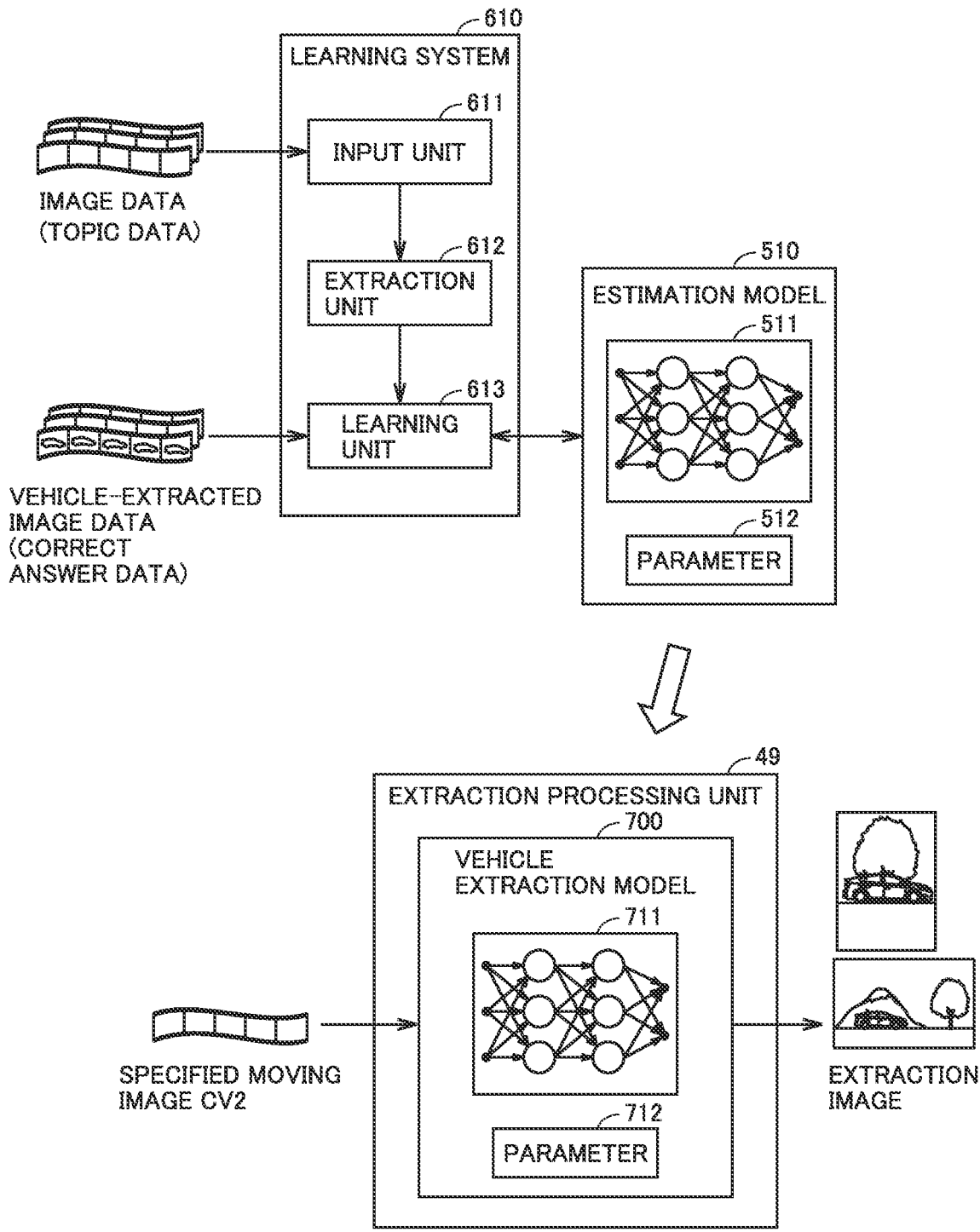
FIG. 13 is a diagram for explaining an example of a learned model (extraction processing model) used in the extraction processing.

FIG. 13 is a diagram for explaining an example of a learned model (extraction processing model) used in the extraction processing. The estimation model 510, which is a pre-learning model, includes, for example, a neural network 511 and a parameter 512. The neural network 511 is a well-known neural network used for image recognition processing by deep learning. The neural network, such as the CNN (convolutional neural network, the Neural Network) made recursive neural network (RNN: Recurrent Neural Network), and the like. The parameter 512 includes a weighting coefficient used for operation by the neural network 511.

A number of teacher data are prepared in advance by developers. The teacher data includes topic data and correct answer data. The topic data is image data including a vehicle to be imaged. The correct solution data includes an extraction result corresponding to the topic data. Specifically, the correct answer data is a trimming image including a vehicle included in the topic data and a background. The trimming image is a trimming image in which the evaluation value EV is equal to or greater than a predetermined value.

The learning system 610 learns the estimation model 510 using the topic data and the correct solution data. The learning system 610 includes an input unit 611, an extraction unit 612, and a learning unit 613.

The input unit 611 receives a large number of pieces of topic data (image data) prepared by the developer and outputs them to the extraction unit 612.

By inputting the topic data from the input unit 611 to the estimation model 510, the extraction unit 612 extracts the vehicle included in the topic data for each topic data. The extraction unit 612 outputs the extraction result (output from the estimation model 510) to the learning unit 613.

The learning unit 613 learns the estimation model 510 based on the extraction result of the vehicle from the example data received from the extraction unit 612 and the correct answer data corresponding to the example data. Specifically, the learning unit 613 adjusts the parameter 512 (e.g., a weighting coefficient) so that the extraction result of the trimming image including the vehicle and the background obtained by the extraction unit 612 approaches correct data.

The learning of the estimation model 510 is performed as described above, and the estimation model 510 that has been learned is stored as the extraction processing model 700 in the extraction processing unit 49. The extraction processing model 700 receives the specific moving image CV2, and outputs an extraction image including a vehicle and a background.

In the present embodiment, at least one of the storage unit 19 and the storage unit 31 corresponds to a "storage unit" described in the claims, sand the arithmetic processing unit 32 corresponds to a "processing unit" described in the claims.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. An image processing apparatus comprising:
   a storage unit that stores a plurality of frames captured by an imaging apparatus that captures a moving image; and
   a processing unit that selects at least one selection frame from the plurality of frames stored in the storage unit and that outputs an extraction image extracted from the selected selection frame, wherein
   the processing unit sets an initial trimming range in the selected selection frame,
   when an update trimming range allowing for an evaluation value higher than an evaluation value of an image of the initial trimming range is able to be set, the processing unit outputs, as the extraction image, an image trimmed to correspond to the update trimming range,
   when no trimming range allowing for the evaluation value higher than the evaluation value of the image of the initial trimming range is able to be set, the processing unit outputs, as the extraction image, the image of the initial trimming range, and
   the evaluation value of the image of each trimming range is set based on at least one evaluation item of the following evaluation items:
      a positional relationship of a target vehicle in the image of the trimming range,
      a size of the target vehicle in the image of the trimming range,
      a vividness of the target vehicle in the image of the trimming range,
      a brightness of the image of the trimming range, and
      a degree of cutoff of the target vehicle in the image of the trimming range,
   wherein a photographing area captured by the imaging apparatus includes a first background target and a second background target located in front of the first background target in a direction of travel of the target vehicle,
   wherein the processing unit sets a vehicle region occupied by the target vehicle, a first background region occupied by the first background target, a second background region occupied by the second background target, and a composition line in the selected selection frame,
   the composition line includes
      an outer frame,
      a left vertical line and a right vertical line that extend in a vertical direction and are arranged at equal intervals in a horizontal direction, and
      an upper horizontal line and a lower horizontal line extending in a left-right direction and arranged at equal intervals in the vertical direction,
   the outer frame and the right vertical line define a partition region located on a right side of the right vertical line,
   the left vertical line and the upper horizontal line form a first reference intersection point,
   the left vertical line and the lower horizontal line form a second reference intersection point,
   the processing unit sets the composition line to the selected selection frame so that a center of the vehicle region is located at the second reference intersection point, a vertex of the first background target is located at or near the first reference intersection point, and the second background region is located within the partition region, and
   the processing unit sets the initial trimming range by cutting the outer frame.

2. The image processing apparatus according to claim 1, wherein
   the processing unit selects a first selection frame and a second selection frame from the plurality of frames, and
   when an evaluation value of a first extraction image extracted from the first selection frame is higher than an evaluation value of a second extraction image extracted from the second selection frame, the processing unit outputs the first extraction image.

3. The image processing apparatus according to claim 1, wherein the processing unit lowers the evaluation value when an exclusion-target object registered in advance is captured in the image of the trimming range.

4. The image processing apparatus according to claim 1, wherein the processing unit sets the initial trimming range having a different composition based on a position of the target vehicle.

5. The image processing apparatus according to claim 1, wherein
   the processing unit acquires in advance at least one of license plate information of the target vehicle and appearance information specifying an appearance of the target vehicle, and
   the processing unit selects, from the plurality of frames, a frame in which the target vehicle is captured, and creates the extraction image by trimming the selected frame to include the target vehicle.

6. The image processing apparatus according to claim 1, further comprising a memory in which an extraction processing model is stored, wherein
   the extraction processing model is a learned model that receives, as an input, an image including an imaging-target object and that outputs the extraction image having an evaluation value equal to or greater than a predetermined value.

* * * * *